(12) United States Patent
Husain et al.

(10) Patent No.: US 12,360,801 B2
(45) Date of Patent: Jul. 15, 2025

(54) APPLICATION CONTROL IN A VEHICLE

(71) Applicant: Ford Global Technologies, LLC, Dearborn, MI (US)

(72) Inventors: Abdullah Ali Husain, Dearborn, MI (US); Anushree Nagvekar, Novi, MI (US); Srujan Reddy Maram, Farmington Hills, MI (US); Nasser Shuaibi, Dearborn, MI (US); Vyacheslav Zavadsky, Ottawa (CA); Satish Rayarapu, Canton, MI (US); Mirela Ioana Fonoage, Boca Raton, FL (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 18/046,238

(22) Filed: Oct. 13, 2022

(65) Prior Publication Data

US 2024/0126594 A1    Apr. 18, 2024

(51) Int. Cl.
*G06F 9/48* (2006.01)
*G06F 9/455* (2018.01)

(52) U.S. Cl.
CPC ........ *G06F 9/4856* (2013.01); *G06F 9/45558* (2013.01); *G06F 2009/45583* (2013.01)

(58) Field of Classification Search
CPC ............... G06F 9/4856; G06F 9/45558; G06F 2009/45583; G06F 9/542; G06F 21/53; G06F 2009/45587; G06F 9/455
See application file for complete search history.

(56) References Cited

U.S. PATENT DOCUMENTS

| | | | |
|---|---|---|---|
| 8,326,943 B2 | 12/2012 | Chinta et al. | |
| 2012/0059876 A1* | 3/2012 | Chinta | G06F 21/53 709/217 |
| 2018/0373505 A1* | 12/2018 | Engquist | G06F 8/34 |
| 2021/0309239 A1 | 10/2021 | Hermann | |
| 2021/0407220 A1 | 12/2021 | Fang et al. | |
| 2023/0143265 A1* | 5/2023 | Hofmockel | G06F 11/3668 714/38.1 |
| 2023/0393833 A1* | 12/2023 | Cain, Jr. | H04L 9/3247 |

* cited by examiner

*Primary Examiner* — Navid Z. Mehdizadeh
*Assistant Examiner* — Shelley Marie Osterhout
(74) *Attorney, Agent, or Firm* — Christopher Storms; Brooks Kushman P.C.

(57) ABSTRACT

A computer includes a processor and a memory, and the memory stores instructions executable by the processor to execute an application in an isolated software environment on a controller of a vehicle; upon receiving a command from the application to actuate a component of the vehicle, prevent the command from being transmitted to the component; and upon receiving the command, transmit the command to a location in the memory.

17 Claims, 4 Drawing Sheets

APPLICATION CONTROL IN A VEHICLE

BACKGROUND

Modern vehicles typically include controllers. The controllers are distinct computing devices, e.g., electronic control units (ECUs). The controllers can be programmed for performing different functions for the vehicle by executing applications. The applications can control features of the vehicle. For example, applications can determine a braking force based on a position of a brake pedal, shift gears based on a revolutions per minute of an engine, determine a torque applied by an electric power assist steering (EPAS) actuator, pair an infotainment system with a mobile device of an operator, etc. The applications can serve as drivers for components of the vehicle, i.e., can provide a software interface for the components. The components can be sensors such as cameras, radars, ultrasonic sensors, inertial measurement units, temperature sensors, GPS sensors, wheel-speed sensors, etc.; actuatable components such as brake actuators, the EPAS actuator, windshield wipers, headlights, etc.; user interface components such as screens and displays, speakers, microphones, etc.; or other types of components.

DETAILED DESCRIPTION

Figure 1:
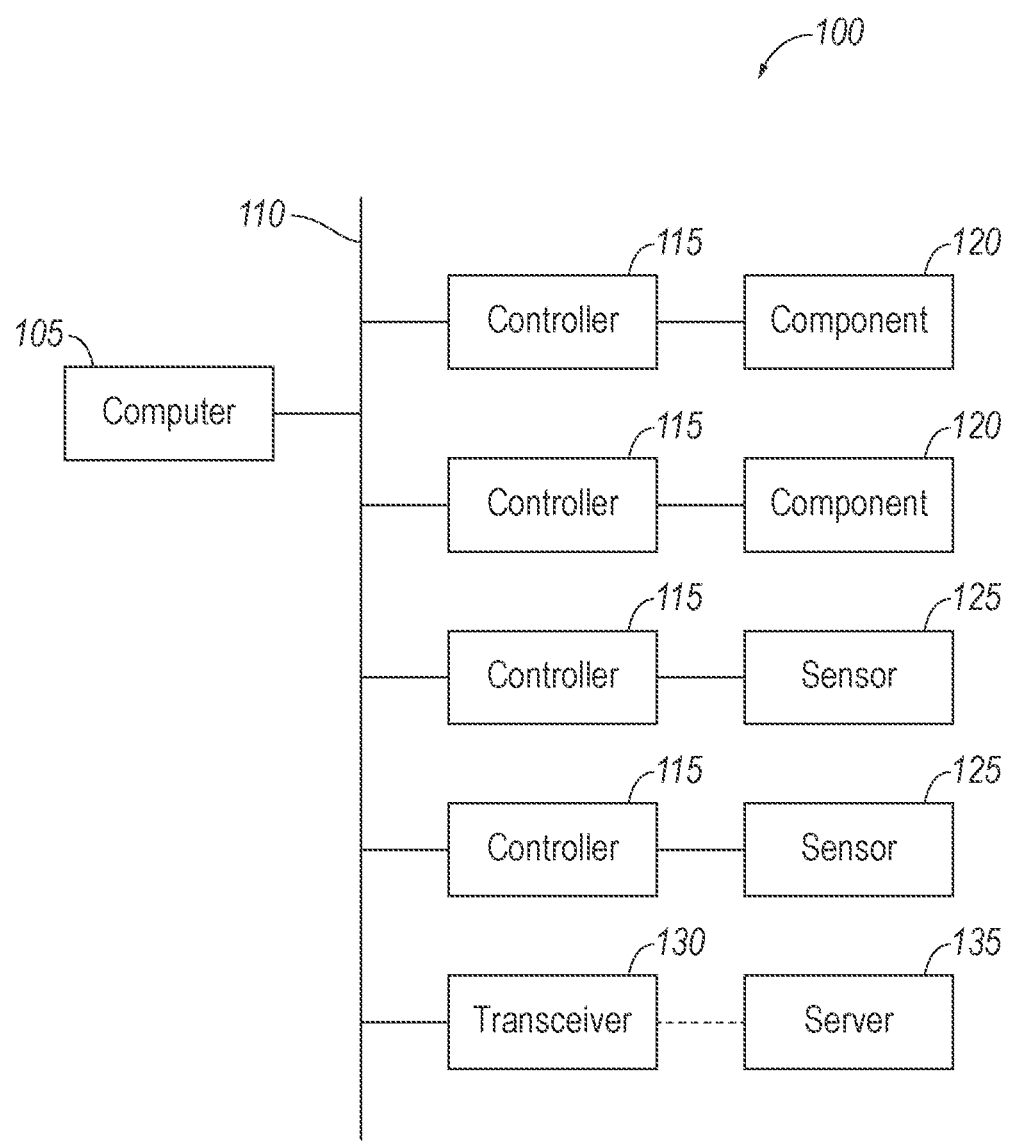
FIG. 1 is a block diagram of an example vehicle.

Systems and techniques are provided for isolating an application on board a vehicle. The techniques are useful for testing the performance of new applications in a wide variety of real-world conditions. To test a new application, a computer is programmed to execute the application in an isolated software environment on a controller of a vehicle; upon receiving a command from the application to actuate a component of the vehicle, prevent the command from being transmitted to the component; and upon receiving the command, transmit the command to a location in the memory. Beneficially, the computer prevents the application from changing the operation of the vehicle (so that the vehicle will operate like a vehicle lacking the application). A server may wirelessly transmit the application to a large number of vehicles to be tested. The vehicles may then track the commands outputted by the application and data related to the performance of the application in the location in the memory. The commands issued by the application are tracked at the location to show how the application would have operated the vehicle if not isolated. The vehicles may transmit the contents of their respective locations to the server. Updated versions of the application may be iteratively tested in the isolated software environment on board the vehicles without affecting the operation of the vehicles until the testing is deemed complete. After the testing of the application is completed, the application may be included in new vehicles and/or the application may be transmitted to the vehicles to run in a nonisolated manner.

A computer includes a processor and a memory, and the memory stores instructions executable by the processor to execute an application in an isolated software environment on a controller of a vehicle; upon receiving a command from the application to actuate a component of the vehicle, prevent the command from being transmitted to the component; and upon receiving the command, transmit the command to a location in the memory.

In an example, the instructions may further include instructions to prevent messages sent by the application from being received at destinations other than the location in the memory.

In an example, the instructions may further include instructions to prevent the application from consuming greater than a threshold amount of processing capacity of the controller.

In an example, the instructions may further include instructions to, upon receiving a message from outside the isolated software environment for the application, permit the application to receive the message.

In an example, the instructions may further include instructions to operate a service-oriented architecture, and the application is programmed to publish the command over the service-oriented architecture. In a further example, the instructions may further include instructions to, upon receiving the command, prevent the command from publishing over the service-oriented architecture.

In a further example, the instructions may further include instructions to, upon receiving a message over the service-oriented architecture to which the application is subscribed, permit the application to receive the message based on a policy. In a yet further example, the policy may indicate a type of messages that the application is permitted to receive.

In a yet further example, the policy has been tested with a validation script.

In an example, the instructions may further include instructions to receive the application from a server remote from the vehicle via a transceiver of the vehicle. In a further example, the instructions may further include instructions to execute the application in the isolated software environment based on a status of the application, the status received from the server via the transceiver.

In a further example, the instructions may further include instructions to, upon occurrence of a key-off cycle after receiving the application from the server, activate the application such that the application is available for execution in the isolated software environment.

In an example, the instructions may further include instructions to instruct a transceiver of the vehicle to transmit contents of the location in the memory including the command to a server remote from the vehicle.

In an example, the instructions may further include instructions to transmit data to the location, the data indicating operation of the vehicle contemporaneous with the application outputting the command.

In an example, the application may be a first application, the command may be a first command, the instructions may further include instructions to execute a second application outside the isolated software environment, and the second application may be programmed to issue a second command to actuate the component.

In an example, the isolated software environment may be defined by an operating system.

In an example, the isolated software environment may be defined by a platform on top of an operating system.

In an example, the isolated software environment may be a virtual machine.

In an example, the isolated software environment may be a container.

A method includes executing an application in an isolated software environment on a controller of a vehicle; upon receiving a command from the application to actuate a component of the vehicle, preventing the command from being transmitted to the component; and upon receiving the command, transmitting the command to a location in a memory.

With reference to the Figures, wherein like numerals indicate like parts throughout the several views, a computer 105 includes a processor and a memory, and the memory stores instructions executable by the processor to execute an application 205 in an isolated software environment 250 on a controller 115 of a vehicle 100; upon receiving a command from the application 205 to actuate a component 120 of the vehicle 100, prevent the command from being transmitted to the component 120; and upon receiving the command, transmit the command to a location in the memory.

With reference to FIG. 1, the vehicle 100 may be any passenger or commercial automobile such as a car, a truck, a sport utility vehicle, a crossover, a van, a minivan, a taxi, a bus, etc.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 110 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to the controllers 115 for the components 120 and sensors 125 and to a transceiver 130 via the communications network 110.

The controllers 115 are microprocessor-based computing devices, e.g., generic computing devices including a processor and a memory, an electronic control unit (ECU) or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. Each controller 115 can thus include a processor, a memory, etc. The memory of each controller 115 can include media for storing instructions executable by the processor as well as for electronically storing data and/or databases, and/or the controller 115 can include structures such as the foregoing by which programming is provided.

The controllers 115 can be programmed for performing different functions for the vehicle 100. For example, the controllers 115 can include an engine control module, a body control module, a restraint control module, an accessory control module, a power-steering control module, an antilock brake control module, etc. The vehicle 100 may contain between fifty and one hundred controllers 115.

The controllers 115, e.g., a subset of the controllers 115, may be communicatively coupled to respective components 120. The components 120 are actuatable to perform an action or task. For example, the components 120 may include physically actuatable components such as brake actuators, the electric power assist steering (EPAS) actuator, windshield wipers, etc.; lights such as headlights, turn indicators, brake lights, passenger compartment lights, etc.; user interface components such as screens and displays, speakers, microphones, etc.; or other types of components. The components 120 may affect operation of the vehicle 100, e.g., by being part of a propulsion system, brake system, and/or steering system of the vehicle 100.

The propulsion system of the vehicle 100 generates energy and translates the energy into motion of the vehicle 100. The propulsion system may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system can include at least one controller 115 that is in communication with and receives input from the computer 105 and/or a human operator. The human operator may control the propulsion system via, e.g., an accelerator pedal and/or a gear-shift lever.

The brake system is typically a conventional vehicle braking subsystem and resists the motion of the vehicle 100 to thereby slow and/or stop the vehicle 100. The brake system may include friction brakes such as disc brakes, drum brakes, band brakes, etc.; regenerative brakes; any other suitable type of brakes; or a combination. The brake system can include at least one controller 115 that is in communication with and receives input from the computer 105 and/or a human operator. The human operator may control the brake system via, e.g., a brake pedal.

The steering system is typically a conventional vehicle steering subsystem and controls the turning of the wheels. The steering system may be a rack-and-pinion system with electric power-assisted steering, a steer-by-wire system, as both are known, or any other suitable system. The steering system can include at least one controller 115 that is in communication with and receives input from the computer 105 and/or a human operator. The human operator may control the steering system via, e.g., a steering wheel.

The controllers 115, e.g., a subset of the controllers 115, may be communicatively coupled to respective sensors 125. The sensors 125 may provide data about operation of the vehicle 100, for example, wheel speed, wheel orientation, and engine and transmission data (e.g., temperature, fuel consumption, etc.). The sensors 125 may detect the location and/or orientation of the vehicle 100. For example, the sensors 125 may include global positioning system (GPS)

sensors; accelerometers such as piezo-electric or microelectromechanical systems (MEMS); gyroscopes such as rate, ring laser, or fiber-optic gyroscopes; inertial measurements units (IMU); and magnetometers. The sensors 125 may detect the external world, e.g., objects and/or characteristics of surroundings of the vehicle 100, such as other vehicles, road lane markings, traffic lights and/or signs, pedestrians, etc. For example, the sensors 125 may include radar sensors, ultrasonic sensors, scanning laser range finders, light detection and ranging (lidar) devices, and image processing sensors such as cameras.

The transceiver 130 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 130 may be adapted to communicate with a server 135 remote from the vehicle 100, that is, distinct and spaced from the vehicle 100. The server 135 may be located outside the vehicle 100. For example, the server 135 may be associated with another vehicle (e.g., V2V communications), an infrastructure component (e.g., V2I communications), an emergency responder, a mobile device associated with the owner of the vehicle 100, a fleet owner or manager for the vehicle 100, a manufacturer of the vehicle 100, etc. The transceiver 130 may be one device or may include a separate transmitter and receiver.

Figure 2:
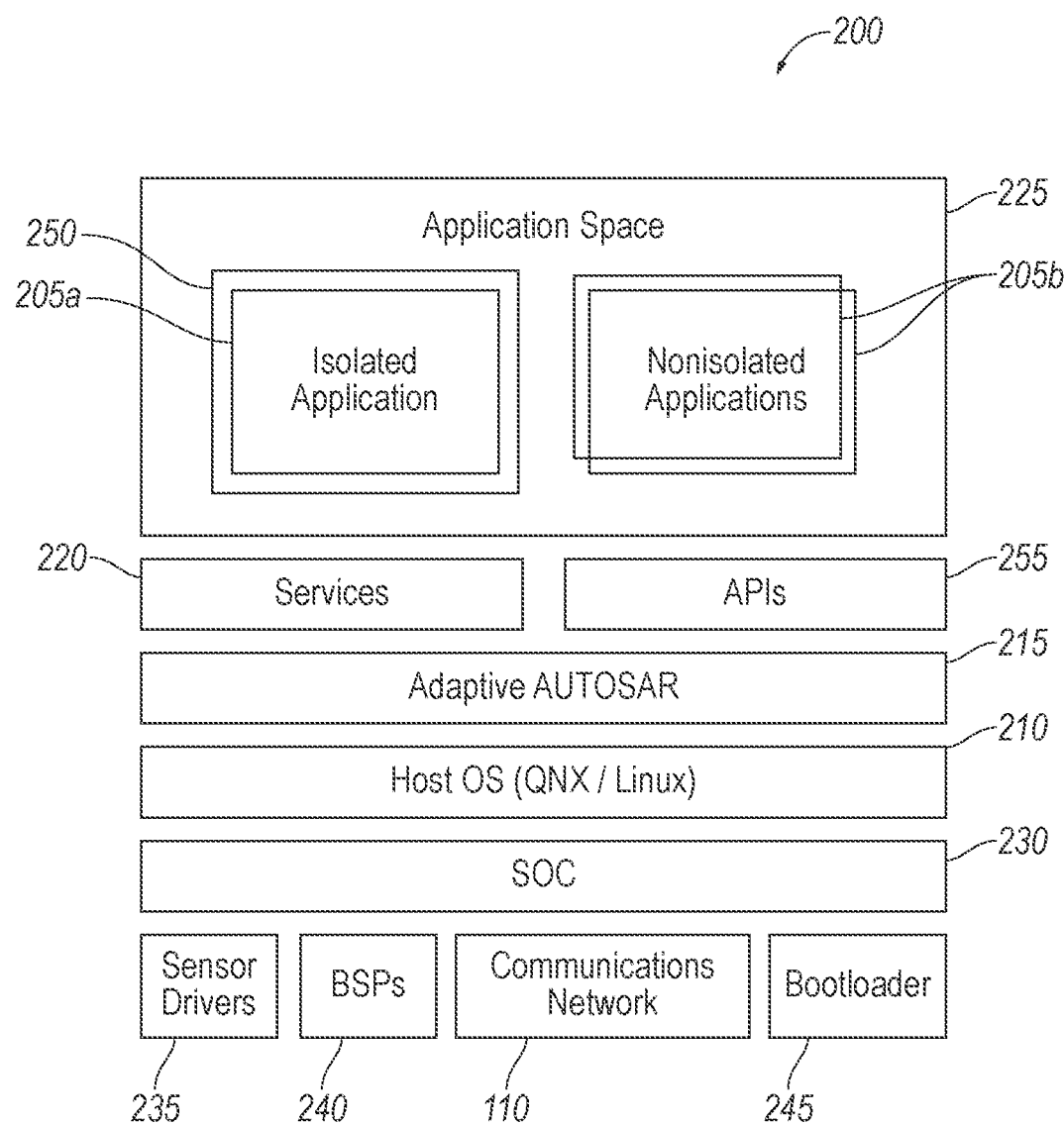
FIG. 2 is a diagram of an example software architecture of the vehicle.

With reference to FIG. 2, an architecture 200 is shown for software running on the controllers 115 of the vehicle 100. The architecture 200 includes an operating system 210, a platform 215 running on the operating system 210, services 220 and application programming interfaces (APIs) 255 of the platform 215, and an application space 225 for applications 205 to run on the platform 215. The platform 215 and operating system 210 may run on a service-oriented communications (SoC) layer 230 that interfaces between the operating system 210 and software packages for specific hardware on the vehicle 100, e.g., drivers 235 for the sensors 125, board support packages 240 for sensors 125 or components 120, the communications network 110, a bootloader 245 for the operating system 210, etc. The SoC layer 230 may be implemented as a service-oriented architecture 300, described below with respect to FIG. 3.

The operating system 210 is system software that manages hardware, software resources, and the services 220 and APIs 255 for the applications 205. The operating system 210 may be any operating system suitable for embedded systems, e.g., Linux, QNX, etc.

The platform 215 may provide additional functionalities on top of the operating system 210. For example, the platform 215 may be Autosar Adaptive Platform, which provides functionalities, e.g., the services 220, specific for the automotive environment. The platform 215 may implement the Autosar Runtime for Adaptive Applications. The Autosar Adaptive Platform and the Autosar Runtime for Adaptive Applications may follow standards promulgated by the consortium Autosar.

The services 220 may include update and configuration management, communication management, identity and access management, execution management, state management, etc. The service 220 for update and configuration management handles updating software packages, the applications 205, and the platform 215. The service 220 for communication management handles the service-oriented architecture 300, described below with respect to FIG. 3.

The service 220 for identity and access management provides a standardized interface to access management operations. The service 220 for execution management handles initialization of the platform 215, startup and shutdown of the applications 205, and lifecycle management for the platform 215 and the applications 205. The service 220 for state management handles the operational state of the platform 215, including incoming events and the prioritization of these events and of requests to set the corresponding internal states.

The applications 205 run in the application space 225. An application 205 is a software program installed on one of the controllers 115, e.g., a navigation application, a data-processing program for one of the sensors 125 such as a camera, a driver-assistance system such as active cruise control, etc. The applications 205 may control the components 120 of the vehicle 100, directly or indirectly. The applications 205 may control the components 120 based on data from the sensors 125, inputs from an operator, inputs from other applications 205, etc. For example, applications 205 can determine a braking force based on a position of a brake pedal, shift gears based on a revolutions per minute of an engine, determine a torque applied by an electric power assist steering (EPAS) actuator, pair an infotainment system with a mobile device of an operator, etc. For other examples, the applications 205 may control more complex actuations of the components 120, e.g., antilock braking, control of the suspension system, or advanced driver assistance systems (ADAS) such as automatic braking, lane-keeping assist, etc.

The computer 105 may be programmed to receive one of the applications 205 from the server 135 remote from the vehicle 100 via the transceiver 130. The server 135 may transmit the application 205 to the vehicle 100 along with a status of the application 205. The status may indicate whether the application 205 is to be isolated or nonisolated, as described below. Applications 205 to be isolated may be provided by the server 135 for testing purposes, not for operation of the vehicle 100. Nonisolated applications 205b may be for operating the vehicle 100. The computer 105 may receive the application 205 and the status as a single download from the server 135.

The computer 105 may be programmed to activate the application 205 such that the application 205 is available for execution. For example, the computer 105 may use the service 220 for update and configuration management, as described in standards promulgated by Autosar. The computer 105 may activate the application 205 after receiving the application 205 from the server 135 and before executing the application 205. For example, the computer 105 may activate the application 205 upon occurrence of a key-off cycle after receiving the application 205 from the server 135, i.e., upon the vehicle 100 being turned off after receiving the application 205, thereby preventing interference with a trip of the vehicle 100.

The computer 105 may be programmed to execute the application 205 on one of the controllers 115. The computer 105 executes the application 205 in (or outside of) the isolated software environment 250 based on the status of the application 205 that was received from the server 135. If the application 205 is an isolated application 205a according to the status received from the server 135, the computer 105 may execute the application 205 in the isolated software environment 250 in the application space 225 on a controller 115 of the vehicle 100. If the application 205 is a nonisolated application 205b according to the status received from the server 135, the computer 105 may execute the application 205 outside of the isolated software environment 250 on a controller 115 of the vehicle 100. The computer 105 may activate the application 205 such that the application 205 is available for execution in or outside of the isolated software environment 250, depending on the status, e.g., using the service 220 for update and configuration management.

The isolated software environment 250 restricts interaction between software running inside the isolated software environment 250 and software running outside the isolated software environment 250. For example, the isolated software environment 250 may be an isolated partition defined by the platform 215, an isolated partition or namespace defined by the operating system 210, a virtual machine, a container, etc., as described in turn below. If the computer 105 includes multiple isolated applications 205a, then each isolated application 205a may have its own isolated software environment 250.

The isolated software environment 250 may be an isolated partition defined by the platform 215. For example, the application 205 may be run in a single software cluster of the platform 215. A software cluster is a software package including one or a set of applications 205 and/or models and the parameters for those applications 205 and/or models. The computer 105 may establish the software cluster serving as the isolated software environment 250 by using the service 220 for update and configuration management. The computer 105 may provide separate addressing, e.g., virtual address space, for the software cluster by using the service 220 for identity and access management.

The isolated software environment 250 may be defined by the operating system 210. For example, the isolated software environment 250 may be a namespace and/or cgroup within Linux or an adaptive partition, resource limit, and/or sandbox within QNX. Namespaces within Linux can restrict a view of the system available to applications 205 operating in the namespace with respect to the process tree, network interfaces, mounts, etc. Cgroups within Linux can restrict resource usage by applications 205 operating in the cgroup. Adaptive partitions within QNX can restrict resource usage by applications 205 operating in the adaptive partition, and resource limits can restrict resource usage by particular processes. Sandboxing within QNX can restrict network access by applications 205 operating in the sandbox.

The isolated software environment 250 may be a virtual machine. A virtual machine runs one or more applications 205 along with its own operating system, services, APIs, etc. separate from the operating system 210 of the vehicle 100. The virtual machine borrows resources from the operating system 210, e.g., CPU time, memory, storage, etc. The isolation of the resources for the virtual machine is provided using a kernel.

The isolated software environment 250 may be a container, i.e., the application 205 may be containerized. Containerization means the packaging of software code, in this case one of the applications 205, with just the operating system libraries and other necessary software for the software code to execute, so that the containerized application 205 can be deployed to different computing environments. The computer 105 may run any suitable container for the choice of operating system 210 and/or platform 215, e.g., runC for Linux, containerd for Linux, etc.

The computer 105 may be programmed to prevent the isolated application 205a from consuming greater than a threshold amount of processing capacity of the controller 115. The threshold may be chosen to permit reliable performance by the nonisolated applications 205b running on the controller 115. The computer 105 may prevent greater consumption than the threshold as a feature of the isolated software environment 250, e.g., cgroups, adaptive partitions, usage limits on the virtual machine, etc.

Figure 3:
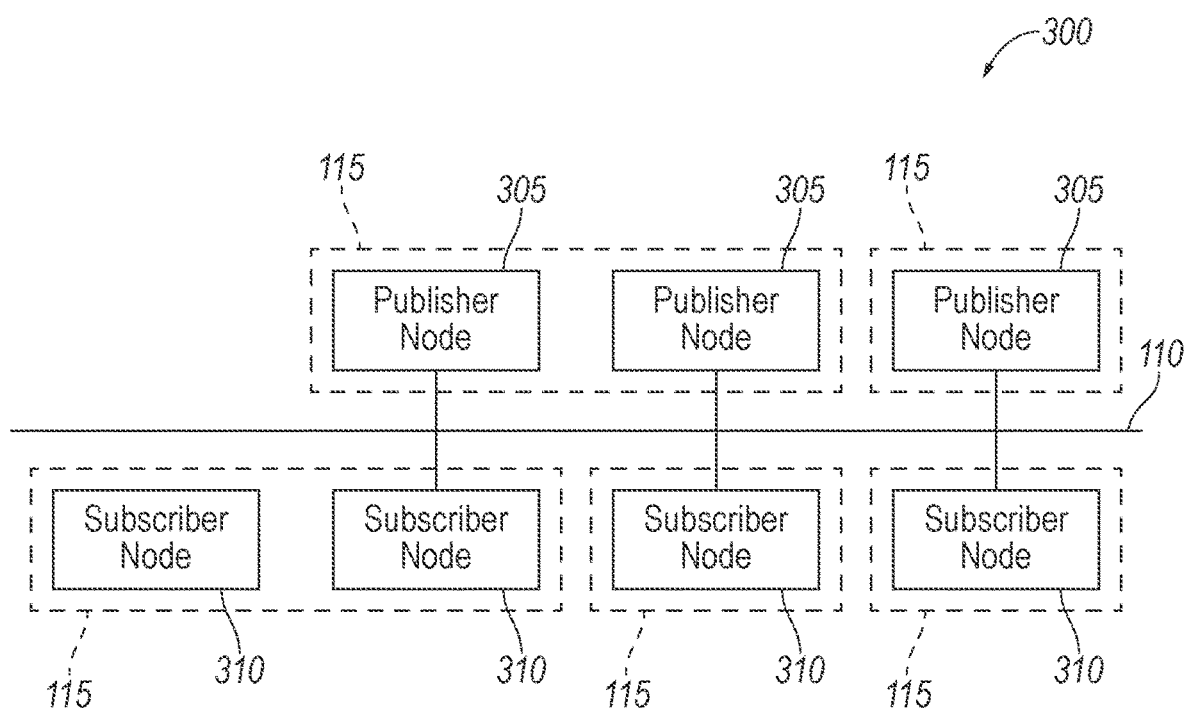
FIG. 3 is a block diagram of an example service-oriented architecture of the vehicle.

With reference to FIG. 3, the computer 105 is programmed to operate the service-oriented architecture 300. The service-oriented architecture 300 is implemented on the computer 105, the controllers 115, and the communications network 110. The service-oriented architecture 300 is a software environment, i.e., implemented according to program instructions stored an executable by the computer 105 and/or the controllers 115, in which applications 205 on devices on the communications network 110, e.g., the computer 105 and/or controllers 115, act as publishers 305 or subscribers 310 for message topics. A message topic is a category of data or update for which messages can be sent between applications 205. Examples of message topics may include different types or categories of data produced by the sensors 125, e.g., a message topic could be image data from cameras or a particular camera, engine temperature from a temperature sensor, position updates from a GPS sensor, etc.; commands to the components 120, e.g., a message topic could be acceleration requested, actuation mode of windshield wipers, etc.; and so on.

A publisher 305 for a given message topic sends messages about the message topic to subscribers 310 to that message topic; e.g., the data-processing program can be a publisher 305 of image data, and the driver-assistance system can be a subscriber 310 to the image data. For another example, a GPS program can be a publisher 305 of position updates, and the navigation application can be a subscriber 310 to the position updates. Each controller 115 can have multiple applications 205 installed. An application 205 can be a publisher 305 or a subscriber 310 with respect to a specific message topic. The same application 205 can be a publisher 305 for one message topic and a subscriber 310 for a different message topic.

The computer 105 may be programmed to, upon receiving a message from outside the isolated software environment 250 for the isolated application 205a, permit the isolated application 205a to receive the message, e.g., selectively permit the isolated application 205a to receive the message. For example, the message may be a message sent over the service-oriented architecture 300 to which the isolated application 205a is subscribed, i.e., the isolated application 205a is a subscriber 310 for the message topic of the message. For example, the computer 105 may store a policy and permit the isolated application 205a to receive certain messages based on the policy. The policy may be implemented by the service 220 for communications management. The policy may indicate one or more types of messages, e.g., message topics, that the isolated application 205a is permitted to receive. For example, the policy may list the types of messages that the isolated application 205a is permitted to receive, and other types are prohibited. Alternatively, the policy may list the types of messages that the isolated application 205a is prohibited from receiving, and other types are permitted. The computer 105 may, upon receiving a message for the isolated application 205a, e.g., a message over the service-oriented architecture 300 to which the isolated application 205a is subscribed, permit the isolated application 205a to receive the message based on the policy, e.g., based on the policy indicating that the isolated application 205a is permitted to receive messages of that type. The computer 105 may, upon receiving a different message for the isolated application 205a, e.g., another message over the service-oriented architecture 300 to which the isolated application 205a is subscribed, prevent the isolated application 205a from receiving the message based on the policy, e.g., based on the policy indicating that the isolated application 205a is not permitted to receive messages of that type. The isolated application 205a may thus be tested for how the isolated application 205a responds to environments and contexts which the vehicle 100 travels because the isolated application 205a receives data indicating those environments and contexts.

The isolated application 205a may be programmed to send a command to actuate one of the components 120 of the vehicle 100, e.g., to publish the command over the service-oriented architecture 300. The computer 105 is programmed to, upon receiving the command from the isolated application 205a to actuate the component 120, prevent the command from being transmitted to the component 120, e.g., prevent the command from publishing over the service-oriented architecture 300. For example, the computer 105 may prevent messages sent by the isolated application 205a from being received at destinations other than a location in the memory of the computer 105 (described below). The computer 105 may prevent the messages sent by the isolated application 205a from transmitting over the communications network 110 to destinations other than the location in the memory of the computer 105. The computer 105 may prevent all commands from the isolated application 205a from being received at destinations other than the location. The isolated application 205a may thus be prevented from affecting operation of the vehicle 100.

The computer 105 may be programmed to execute an application 205 outside the isolated software environment 250, i.e., a nonisolated application 205b. The computer 105 may be programmed to, upon receiving a message for the nonisolated application 205b, permit the nonisolated application 205b to receive the message. The nonisolated application 205b may be programmed to send a command to actuate one of the components 120 of the vehicle 100, e.g., to publish the command over the service-oriented architecture 300. The computer 105 may be programmed to permit the command from the nonisolated application 205b to be transmitted to the component 120, e.g., by publishing over the service-oriented architecture 300.

The computer 105 may transmit data to the location in the memory. The computer 105 may be programmed to, upon receiving the command from the isolated application 205a to actuate the component 120, transmit the command to the location. The computer 105 may be programmed to transmit other data to the location. The other data may indicate operation of the vehicle 100 contemporaneous with the isolated application 205a outputting the command or environmental conditions of the vehicle 100 contemporaneous with the isolated application 205a outputting the command. For example, the other data may include data indicating actuations of some of the components 120, data from the sensors 125, data indicating location of the vehicle 100 and/or current time, etc. The location may be specified by an address in the memory of the computer 105 or by multiple addresses in the memory of the computer 105, e.g., consecutive or nonconsecutive addresses.

The instructions described herein may be tested with a validation script, e.g., before installation. For example, the policy described above may be tested with the validation script. For example, the validation script may traverse ports of the service-oriented architecture 300 that are connected to the isolated software environment 250, e.g., as specified by the policy described above, to determine whether the publishers 305 and subscribers 310 that are able to communicate with the isolated application 205a are on a preset list. The preset list may include the publishers 305 and subscribers 310 that are approved for use when testing applications 205. Alternatively or additionally, the validation script may determine whether a manifest of the isolated application 205a permits consumption of greater than the threshold amount of processing capacity by the isolated application 205a.

The computer 105 may be programmed to instruct the transceiver 130 to transmit contents of the location in the memory including the command to the server 135. For example, the computer 105 may transmit the contents of the location at a predetermined time if the transceiver 130 has a sufficiently high signal strength to make the transmission or at a next time after the predetermined time that the transceiver 130 has a sufficiently high signal strength. The predetermined time may be at an end of a trip of the vehicle 100, as indicated by the vehicle 100 turning off. Alternatively or additionally, the predetermined time may be periodic, i.e., at a regularly recurring interval or distance traveled. The interval or distance may be chosen based on a capacity of the location in the memory of the computer 105.

Figure 4:
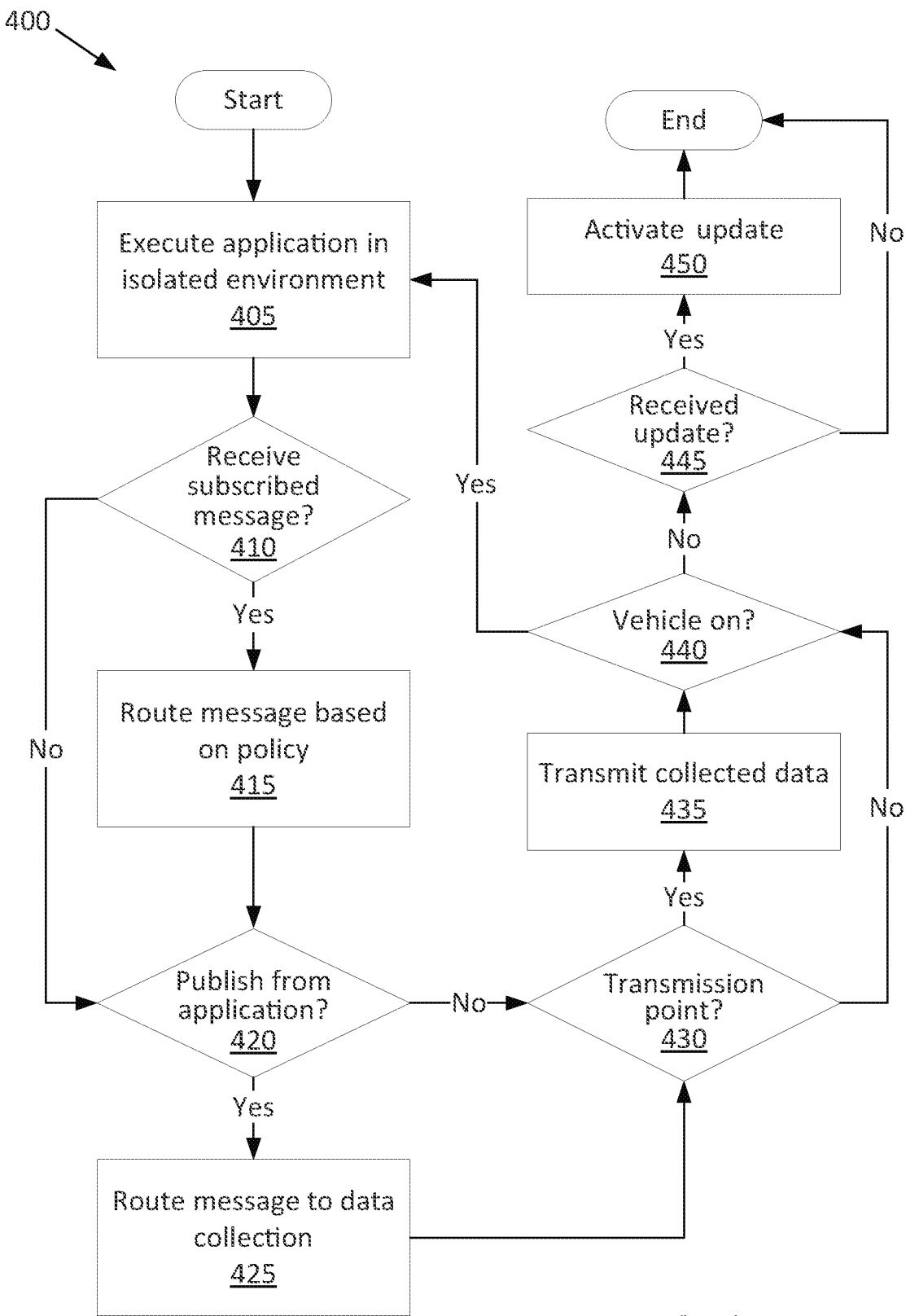
FIG. 4 is a process flow diagram of an example process for controlling an application on the vehicle.

FIG. 4 is a process flow diagram illustrating an example process 400 for controlling the isolated application 205a on the vehicle 100. The memory of the computer 105 stores executable instructions for performing the steps of the process 400 and/or programming can be implemented in structures such as mentioned above. The process 400 may begin upon the vehicle 100 being turned on. As a general overview of the process 400, the computer 105 executes the isolated application 205a in the isolated software environment 250. Upon receiving a message from outside the isolated software environment 250 for the isolated application 205a, the computer 105 permits or prevents the isolated application 205a to receive the message based on the policy. Upon receiving a command from the isolated application 205a to actuate a component 120 of the vehicle 100, the computer 105 prevents the command from being transmitted to the component 120 and instead transmits the command to the location in the memory of the computer 105. In response to conditions for transmitting the contents of the location being met, the computer 105 instructs the transceiver 130 to transmit the contents of the location to the server 135. The computer 105 continues to perform the foregoing steps for as long as the vehicle 100 remains on. In response to the vehicle 100 turning off, the computer 105 determines whether an application 205 has been received from the server 135. If so, the computer 105 activates the application 205.

The process 400 begins in a block 405, in which the computer 105 executes the isolated application 205a in the isolated software environment 250 on the controller 115 of the vehicle 100, as described above.

Next, in a decision block 410, the computer 105 determines whether the computer 105 has received a message from outside the isolated software environment 250 for the isolated application 205a, e.g., a message over the service-oriented architecture 300 for a message topic to which the isolated application 205a is subscribed, as described above. Upon receiving the message, the process 400 proceeds to a block 415. Otherwise, the process 400 proceeds to a decision block 420.

In the block 415, the computer 105 routes the message based on the policy, e.g., permits the isolated application 205a to receive the message if the policy indicates that the isolated application 205a has permission or prevents the isolated application 205a from receiving the message if the policy indicates that the isolated application 205a is prohibited, as described above. After the block 415, the process 400 proceeds to the decision block 420.

In the decision block 420, the computer 105 determines whether the computer 105 has received a command from the isolated application 205a to actuate a component 120 of the vehicle 100, as described above. Upon receiving the command, the process 400 proceeds to a block 425. Otherwise, the process 400 proceeds to a decision block 430.

In the block 425, the computer 105 prevents the command from being transmitted to the component 120, as described above. The computer 105 transmits the command to the location in the memory of the computer 105, as described above. The computer 105 transmits other data to the location that was generated contemporaneous with the isolated application 205a outputting the command, as described above. After the block 425, the process 400 proceeds to the decision block 430.

In the decision block 430, the computer 105 determines whether to transmit the contents of the location in the memory, as described above. If so, the process 400 proceeds to a block 435. If not, the process 400 proceeds to a decision block 440.

In the block 435, the computer 105 instructs the transceiver 130 to transmit the contents of the location in the memory to the server 135, as described above. After the block 435, the process 400 proceeds to the decision block 440.

In the decision block 440, the computer 105 determines whether the vehicle 100 is still on. If so, the process 400 returns to the block 405 to continue executing the isolated application 205a in the isolated software environment 250. If not, the process 400 proceeds to a decision block 445.

In the decision block 445, the computer 105 determines whether the computer 105 has received an application 205 from the server 135 via the transceiver 130 since the previous key-off, e.g., a new application 205 or an update of an application 205 already on the vehicle 100, as described above. If so, the process 400 proceeds to a block 450. If not, the process 400 ends.

In the block 450, the computer 105 activates the application 205 such that the application 205 is available for execution, either in the isolated software environment 250 or outside the isolated software environment 250 depending on the status received with the application 205. After the block 450, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
   receive an isolated application from a server remote from a vehicle via a transceiver of the vehicle;
   upon occurrence of a key-off cycle after receiving the isolated application from the server, activate the isolated application such that the isolated application is available for execution in an isolated software environment;
   execute the isolated application in the isolated software environment on a controller of the vehicle;
   upon receiving a first command from the isolated application to actuate a component of the vehicle, prevent the first command from being transmitted to the component;
   upon receiving the first command, transmit the first command to a location in the memory; and
   execute a nonisolated application outside the isolated software environment, the nonisolated application being programmed to issue a second command that actuates the component.

2. The computer of claim 1, wherein the instructions further include instructions to prevent messages sent by the isolated application from being received at destinations other than the location in the memory.

3. The computer of claim 1, wherein the instructions further include instructions to prevent the isolated application from consuming greater than a threshold amount of processing capacity of the controller.

4. The computer of claim 1, wherein the instructions further include instructions to, upon receiving a message from outside the isolated software environment for the isolated application, permit the isolated application to receive the message.

5. The computer of claim 1, wherein the instructions further include instructions to operate a service-oriented architecture, and the isolated application is programmed to publish the first command over the service-oriented architecture.

6. The computer of claim 5, wherein the instructions further include instructions to, upon receiving the first command, prevent the first command from publishing over the service-oriented architecture.

7. The computer of claim 5, wherein the instructions further include instructions to, upon receiving a message over the service-oriented architecture to which the isolated application is subscribed, permit the isolated application to receive the message based on a policy.

8. The computer of claim 7, wherein the policy indicates a type of messages that the isolated application is permitted to receive.

9. The computer of claim 7, wherein the policy has been tested with a validation script.

10. The computer of claim 1, wherein the instructions further include instructions to execute the isolated application in the isolated software environment based on a status of the isolated application, the status received from the server via the transceiver.

11. The computer of claim 1, wherein the instructions further include instructions to instruct the transceiver of the vehicle to transmit contents of the location in the memory including the first command to the server remote from the vehicle.

12. The computer of claim 1, wherein the instructions further include instructions to transmit data to the location, the data indicating operation of the vehicle contemporaneous with the isolated application outputting the first command.

13. The computer of claim 1, wherein the isolated software environment is defined by an operating system.

14. The computer of claim 1, wherein the isolated software environment is defined by a platform on top of an operating system.

15. The computer of claim 1, wherein the isolated software environment is a virtual machine.

16. The computer of claim 1, wherein the isolated software environment is a container.

17. A method comprising:
   receiving an isolated application from a server remote from a vehicle via a transceiver of the vehicle;
   upon occurrence of a key-off cycle after receiving the isolated application from the server, activating the isolated application such that the isolated application is available for execution in an isolated software environment;
   executing the isolated application in the isolated software environment on a controller of the vehicle;
   upon receiving a first command from the isolated application to actuate a component of the vehicle, preventing the first command from being transmitted to the component;
   upon receiving the first command, transmitting the first command to a location in a memory; and
   executing a nonisolated application outside the isolated software environment, the nonisolated application being programmed to issue a second command that actuates the component.

* * * * *